Figure 1:
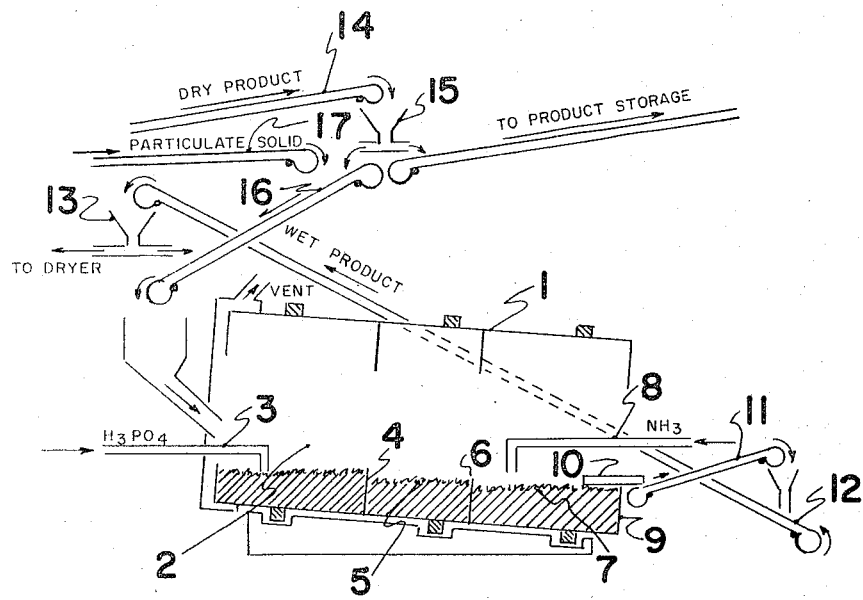

Feb. 28, 1967 W. A. McPHERSON ET AL 3,306,729
PROCESS FOR PRODUCTION OF PARTICULATE FERTILIZER HAVING
A SHELL OF AN AMMONIUM SALT OF PHOSPHORIC ACID
Filed July 1, 1964

INVENTORS
Wilbur A. McPherson
Robert W. Hamilton
BY
Carl A. Cline
AGENT

United States Patent Office 3,306,729
Patented Feb. 28, 1967

3,306,729
PROCESS FOR PRODUCTION OF PARTICULATE FERTILIZER HAVING A SHELL OF AN AMMONIUM SALT OF PHOSPHORIC ACID
Wilbur A. McPherson, Baxter Springs, Kans., and Robert W. Hamilton, Joplin, Mo., assignors to Gulf Oil Corporation, Pittsburgh, Pa., a corporation of Pennsylvania
Filed July 1, 1964, Ser. No. 379,662
2 Claims. (Cl. 71—41)

This application is a continuation-in-part of U.S. Serial No. 101,378, filed April 7, 1961, and now abandoned.

This invention relates to mixed fertilizer compositions and, more particularly, to those fertilizer compositions comprising solid particulate water-soluble compounds of high nitrogen and/or potassium content bearing thereon an external coating of ammonium phosphate, and processes for their production.

The solid particulate fertilizer compounds employed in providing the compositions of this invention by the processes herein disclosed are ammonium nitrate, urea and inorganic salts of potassium.

In view of the common usage and availability of ammonium nitrate as a fertilizer or fertilizer ingredient, it has been desired to incorporate ammonium nitrate in "mixed" fertilizer compositions providing such percentages of $P_2O_5$ as ten percent or thereabouts. Illustratively, it has been desired to supply these mixed fertilizers of ammonium nitrate and a phosphate component wherein the nitrogen to phosphate ratio is of the order of three to one.

Because of difficulties resulting from the hygroscopic nature of ammonium nitrate, many problems have been encountered in economically providing mixed fertilizer containing ammonium nitrate and having such $P_2O_5$ contents. Illustratively speaking, the heretofore provided mixed compositions have usually fallen far short of the free flowability characteristics desired, i.e., the absence of caking after exposure to conditions of storage and shipment. Also, there is difficulty in obtaining uniform particle size, a part of which problem is the presence in this mixture of a minor proportion of undersized particles, denominated in the art as "fines." Lowest possible levels of fines are desired because of their annoyance to the fertilizer consumer during application to the soil, the absence of the "appearance of quality" or "eye appeal" in the final product (an all important factor in consumer acceptance of fertilizer products), and other reasons.

Various means have been proposed previously to provide the desired characteristics in ammonium nitrate fertilizers having substantial phosphate percentages, with varying degrees of partial success. For example, it has been previously proposed to granulate mixtures of crystalline ammonium nitrate with other fertilizer components by conventional granulating procedures. However, it has been difficult to obtain uniform particle size and uniform distribution of the ingredients throughout all of the particles. Furthermore, the usual caking problems associated with storage have been encountered. Additionally, it has been proposed in U.S. Patent No. 2,957,763 to provide an ammonium nitrate prill having a relatively high percentage of $P_2O_5$, such as about ten percent $P_2O_5$. However, this procedure has certain shortcomings and troublesome, expensive limitations such as requiring concentrated phosphoric acid, specially designed prilling towers, and carefully controlled conditions, such as employment of relatively high temperatures in the prilling.

There have been like problems associated with urea fertilizer compositions containing relatively high $P_2O_5$ contents, such as mentioned above with reference to the prior ammonium nitrate compositions. For example, caking during storage is a problem with the urea fertilizers although urea has a lower order of hygroscopicity.

The coating of more hygroscopic fertilizer ingredients with the less soluble components might be expected to alleviate the caking problem. However, use of fine particles of less soluble material to form a coating does not give a sufficiently impervious and adherent coating and leads to production of particles of non-uniform size and shape. Coating techniques in general have been only partially successful, only the more expensive synthetic resin coatings for delayed release of fertilizer having lived up to performance expectations. The resin coatings, however, possess little or no fertilizer value and are merely barriers of controlled porosity.

The most troublesome problem encountered in attempting to make a mixed fertilizer by a coating technique is the difficulty presented by use of an aqueous system to coat a water-soluble material. The type of product desired is one in which the more soluble material is inside and the less soluble material forms the coating. In order to obtain a uniform, impervious coating, the less soluble material must be put into solution, but this leads to at least partial dissolving of the material to be coated, followed by agglomeration or "balling up" in tne coating apparatus and migration of the more soluble components.

If a coating is formed by reacting two substances on the solid particles, it has been characteristic of prior art processes that some reaction also occurs off the particles, resulting in formation of very fine particles of a differing composition. If these fine particles are not screened from the final product, they have a tendency to become segregated and cause difficulty when the fertilizer is put to use.

It would be very desirable to make mixed fertilizer by putting a uniform coating of a non-hygroscopic substance on a variety of fertilizer components, so that by mixing particles either before or after coating, a great variation of chemical composition could be achieved without any substantial variation in appearance or physical behavior of the product. This objective has not previously appeared to be feasible, particularly with regard to mixing various fertilizer components prior to coating.

Disclosed herein is a novel process for manufacturing nitrogen and phosphorus containing mixed fertilizer of varying composition, having ratios of nitrogen to $P_2O_5$ analyses of from 1 to 6:1, consisting of discrete solid particles, each of which has a core made up of a water-soluble fertilizer composition and an intimately bonded shell of an ammonium salt of phosphoric acid. The process may be summarized briefly as comprising the following steps:

(a) Wetting with phosphoric acid containing from about 10 to 30 percent water a moving bed of discrete solid particles of controlled size of at least one water-soluble fertilizer composition, with the provision that particles of differing chemical composition possess substantially identical particle size distribution;

(b) Mixing the discrete solid particles after wetting with acid in step (a) to yield a free-flowing bed of acid-wet particles;

(c) Reacting ammonia with the free-flowing bed of acid-wet particles of step (b) while subjecting said particles to a rolling motion to yield a free-flowing bed of particles of substantially spherical shape;

(d) Drying the particles of substantially spherical shape produced in step (c) to yield a uniform, free-flowing, storage stable fertilizer composition consisting predominantly of particles possessing a core of water-soluble fertilizer composition and an intimately bonded shell of an ammonium salt of phosphoric acid; and (e) Recycling to step (a) a portion of the particles produced by steps (c) and (d).

Figure 2:
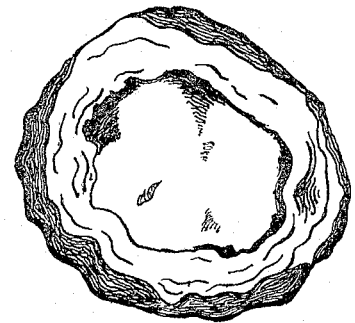

The nature of the process is discussed in detail below, with the aid of drawings and illustrative examples. FIGURE 1 is a simplified diagram of the apparatus and process, illustrating process flow. FIGURE 2 is a drawing of a cross section obtained by fracturing a particle of the coated fertilizer product.

(a) *Wetting solid particles wit phosphoric acid.*—The first three steps in the process are most conveniently carried out in separate sections of a rotating drum type of apparatus, as shown in FIGURE 1. Drums having a diameter on the order of three to twelve feet are suitable, the speed of rotation being regulated so that a shell speed of from about 75 to 250 ft. per minute is obtained. At these speeds the bed of fertilizer particles is lifted rapidly and dropped back into the bottom of the apparatus, minimizing the tendency of the bed to slide without thorough stirring. The length of the drum should be sufficient to provide the required separate reaction zones. A practical setup which has been found to be presently preferred is illustrated diagrammatically in FIGURE 1. A suitable particulate solid of controlled particle size is introduced into a rotating drum 1 which has a small angle of slope from the horizontal toward the discharge end. The drum is rotated at a peripheral speed of for example about 100 to about 200 feet per minute, depending on the depth of the bed which is maintained, the surface roughness and size of the particulate solid employed, and other factors. It has been found that a phosphoric acid reaction zone 2 from about three to five feet in length usually is adequate and can be of a conventional type as to acid distributor and the like. The drum is preferably equipped with flights so as to improve mixing and provide much aeration of the particles during the treatment, thereby assisting in maintenance of the temperature below about 200° F. (93° C.) and in evaporation of excess moisture.

On the basis of the weight of the particles fed into the first reaction zone, phosphoric acid is introduced through the conduit 3 in conventional manner as by spraying on the particles in the required total amount necessary to provide the desired $P_2O_5$ content in the final desired product. Preferably "wet process" phosphoric acid is employed in step (a) of the process. This grade of phosphoric acid is made by treatment of calcium phosphate rock with sulfuric acid and contains substantial and varying proportions of impurities derived from the particular batch of rock used as raw material. The water content of the acid may vary from about 10 to 30 percent, usually about 15 to 20 percent being desirable. Although acid of higher purity made by the furnace proces may be employed, it has been found that wet process acid yields coatings which are somewhat more resistant to impact and abrasion.

In this process a water-soluble fertilizer composition of controlled particle size is fed into the first reactor. It is preferable to employ a fairly narrow, continuous distribution of particle size, as for example, particles which are of a size within the range of 6 to 24 mesh (U.S. Standard Series). The particles need not be similar in shape, providing they are of comparable size, so that good stirring of the bed of particles can be maintained without occurrence of size classification or agglomeration within the bed. Large particles, if much larger than the controlled size, save a tendency to ride on the top of the bed and pass through the process without interferring significantly with formation of the desired product. Thus large lumps or foreign objects which are accidentially fed into the process will pass through and can be removed with a scalping screen and disposed of. However, dust or fine particles smaller than about 35 mesh size are undesirable, a preferred range of particle size distribution being from about 6 to about 24 mesh (U.S. Standard). Fine particles cause "balling up" to occur in step (a), greatly reducing the total number of particles in the bed and causing an increase both in average particle size and in distribution of particle size. It is a unique feature of the present process that the number of particles of fertilizer composition produced is substantially identical to the number of particles fed into the process. In order to accomplish this result, the moving bed must be kept in such a condition that particles roll or slide freely and do not adhere to each other. It is for the purpose of obtaining good mixing and free movement in the bed that from about one-fourth to three-fourths of the total particulate solids fed into step (a) consists of recycled coated product. The recycled material, when wet with phosphoric acid, is sufficiently slippery so as to improve mixing conditions in the bed, besides providing more surface for wetting with acid.

It has been found that when the bed of particles in step (a) consists entirely of dry, uncoated particles, there is a tendency for particles to adhere to each other and form lumps when wet with acid. In starting up the process before recycled product is available it is recommended that only about half of the calculated quantity of acid be sprayed on the particles in step (a).

(b) *Mixing the wet particles.*—It has been found desirable to place a baffle or dam 4 in the rotating drum which separates the phosphoric acid treatment zone from the second or mixing zone 5. The mixing zone provides further time for the phosphoric acid to become firmly associated with the particles and facilitates transfer of some acid from the recycled feed to the uncoated particles. The mixing zone is desirably at least one foot in length and preferably, under most commercial product conditions at least, about two or more feet in length. The free-flowing bed of acid-wet particles produced in this zone then overflows a second dam 6 into the ammoniation zone 7.

(c) *Ammoniation.*—After the acidulated particles leave the mixing zone, they enter the ammoniating zone where the liquid ammonia is introduced through conduit 8 and contacted with the treated prills in conventional manner by a distributor or sparger which is submerged in the fertilizer bed. It has been found desirable to have a retaining dam 9 following the ammoniating zone so as to enable establishment of a free-flowing bed of particles of sufficient depth for efficient ammoniation. The rolling motion in this bed assists in forming the coated particles into substantially spherical shape, since the solidification of the coating and the rolling motion occur simultaneously.

The exothermal reaction of amomnia with phosphoric acid produces considerable heat, which drives off part of the moisture from the coated particles. The temperature should be kept below about 200° F. (93° C.) so as to minimize losses by decomposition of either the ammonium phosphate coating or such fertilizer materials as ammonium nitrate. It is preferable to maintain the temperature within the range of about 160° to 180° F. (71° to 82° C.).

A trough 10 may be placed so as to catch a portion of the product of step (c) as it falls from the rising side of the drum and cause the product to empty onto belt conveyor 11 which in turn dumps onto belt conveyor 12. At the place at which the transfer is made from conveyor 11 to conveyor 12 a scalping screen may be placed, if desired, to catch and remove any lumps or oversized particles which may be in the product. It may happen occasionally that a scale or deposit forms on the interior wall of the reactor and subsequently is dislodged and falls into the product. The scalping screen effectively removes such unwanted material.

(d) *Drying.*—The belt conveyor 12 empties into a flow-dividing apparatus 13, from which the product of step (c) flows into the dryer. Either a rotating drum dryer or a fluidized bed dryer may be employed. Although a separate drying apparatus is preferred so as to permit flexibility in controlling drying conditions, drying may be carried out in a section of the rotating drum reactor. Preferably the temperature of wet product is kept below about 220° F. (104° C.) as it begins the drying process, the temperature being permitted to rise during drying to a temperature of dry product of not more than about 300° F. (149° C.). Normally it is preferable to hold the temperature within the dryer at about 200° F. (93° C.), obtaining efficient drying by regulating the rate of air flow and residence time. Dry product is conveyed from the dryer by belt conveyor 14. The product is a uniform, free-flowing, storage stable fertilizer composition consisting predominantly of substantially spherical particles possessing a core of water-soluble fertilizer composition and an intimately bonded shell of an ammonium salt of phosphoric acid. In FIGURE 2 is an illustration of a fertilizer particle, which has been split to yield a cross-section by fracturing, showing the core (ammonium nitrate) and the intimately bonded shell in which a multiplicity of layers is discernible. It can be seen that this typical particle is substantially spherical, although it is not a perfect sphere. These substantially spherical particles can be stored in bulk in piles, yet retain good flow properties so that they are easily conveyed and do not clog fertilizer application equipment.

(e) *Recycling product.*—Conveyor 14 delivers dry product to the flow-dividing apparatus 15 which may deliver a portion of the stream to the feeder belt 16. Belt conveyor 17 delivers fresh uncoated particulate solids of controlled size distribution to feeder belt 16, to which may also be delivered a portion of the wet product of step (c) by the flow-dividing apparatus 13. The relative proportions of wet and dry recycle streams are adjusted to produce good free-flowing conditions in the phosphoric acid treatment zone 2, dependent upon the percentage of water in the acid, the porosity of the uncoated dry particulate solid and other factors. As a specific illustration, a feed mixture which has been found to be advantageous consists of about one part dry recycle, seven parts of wet recycle and eight parts of dry ammonium nitrate prills. Such a feed mixture can be used to maintain good flow conditions in step (a) when using wet process phosphoric acid containing about sixteen percent water in sufficient quantity to produce a fertilizer with an $N/P_2O_5$ ratio of 3/1.

Having disclosed the method of operating the process, examples are presented below to illustrate the manufacture of specific fertilizer compositions.

*Example 1*

A 30–10–0 analysis range fertilizer product of this invention was prepared as follows: Employed in the run was a granulating drum mounted in the customary manner on trunnions as illustrated diagrammatically in FIGURE 1, having a total length of forty-five feet and a diameter of ten feet. The drum had a horizontal slope of about seventeen inches from the feed end to the discharge end of the drum. The inlet or feed end was equipped with an annular retaining dam having a height of twenty inches. The first forty inches of the granulating drum was equipped with an acid distributor of conventional character which communicated with a supply line to a source of seventy-five percent "wet process" phosphoric acid. The acid distributor consisted of a distributing pipe having forty equally spaced holes with one-half of the holes having a bore size of one-eighth inch and one-half having a bore size of 3/32 inch.

Separating the phosphoric acid treatment zone from the ammoniation reaction zone was a mixing zone of two feet in length through which the acid treated prills passed without being exposed to any further treatment.

Following the two foot mixing zone was an ammoniating zone having a length of about thirty-six inches and equipped with an ammoniating distributor or sparger of a conventional nature which communicated with a supply tank of anhydrous ammonia (containing less than about 0.5 percent water). After ammoniation, the product was transferred to a drying drum which was maintained at a temperature below about 180° F. During the treatment process, air was forced through the drying drum from the discharge end through the feed end by use of an induced draft fan.

In the preparation of the 30–10–0 product, uncoated ammonium nitrate prills having a density of about forty-nine pounds per cubic foot, a moisture content of about 0.25 percent by weight, and having a size such that about ninety percent of the prills fell within a six to fourteen mesh size range, were used. The prills were fed into the granulating drum, which was rotated at a peripheral drum speed of about ninety feet per minute. On a per ton basis of the desired final product, 1,543 pounds of the ammonium nitrate prills were fed into the granulating drum which were treated with 371 pounds of seventy-five percent phosphoric acid. The prills, after being treated with phosphoric acid, were then passed along in the rotating drum on to the ammoniating zone, where the prills were treated with seventy-three pounds of anhydrous ammonia. The ammoniated prills then passed into the drying drum. The dried prills were cooled by incoming air as they were discharged from the drying drum. About one-half of the discharged prills were conveyed to the storage bin for future shipment, and about one-half were recycled to be treated again under the described procedure. This was a sufficient amount of recycling to prevent any agglomeration from occurring in the acid treatment zone.

The prilled product obtained by this process shows the following analysis: Nitrogen, 30.4 percent; $P_2O_5$, 10.8 percent.

A screen analysis of the final product shows the following particle size distribution:

| Mesh size (screen number): | Percent by wt. |
|---|---|
| On 6 | 0.4 |
| On 10 | 61.2 |
| On 12 | 26.2 |
| On 14 | 8.1 |
| On 16 | 3.3 |
| On 20 | 0.7 |
| On 35 | 0.1 |
| Through 35 | 0.03 |

Following essentially the above procedure using a pilot plant-size rotating drum of the above type, a 30–10–0 encased product is obtained having a particle size distribution shown in the following table, therein compared to that of the starting ammonium nitrate prills employed in the run:

| Mesh Size (Screen No.) | Percent by Weight | |
|---|---|---|
| | Product | Starting Ammonium Nitrate Prills |
| On 6 | 0 | 0 |
| On 10 | 61.1 | 34.6 |
| On 12 | 20.5 | 26.5 |
| On 14 | 10.7 | 26.9 |
| On 16 | 4.3 | 6.7 |
| On 20 | 3.0 | 4.3 |
| On 35 | 0.4 | 1.0 |
| Through 35 | 0.0 | 0.0 |

As is seen from the table, substantially all of the final product falls within the six to twenty mesh size range.

When the coated prills are split and examined under a microscope, typical specimens are observed to possess an external shell consisting of a multiplicity of layers. In most instances, from two to four layers are readily observed. The interior of a typical coated ammonium nitrate prill exhibits a rather irregular, crystalline appearance and contains one or more voids of irregular shape. By way of comparison, uncoated prills occasionally contain a centrally located void of nearly spherical shape, resembling a bubble, and exhibit no readily discernible external shell.

The product consisting of ammonium nitrate prills encased in the coating as described in Example 1 above as highly resistant to caking, as shown by customary caking tests when exposed to storage conditions with the varying humidity and temperatures therein encountered. In abbreviated indication of this quality of the prills, it has been found convenient to place a quantity of the end product into a glass bottle with the cap loosened under room conditions and to observe the amount of setting or caking that will occur during a seven-day or longer period, such as one month or more. The product obtained by the process of this invention as a matter of routine shows essentially no caking even without assistance of anti-caking agents. Furthermore, surprising resistance to caking is demonstrated by this simple test, even when intermixed with as much, e.g., as equal quantities by weight of prills of the other high nitrogen-compound, that is, if ammonium nitrate prills are employed in the encasement process, the prills added in the intermixing are of urea, or contrariwise.

The coated prill product furthermore, as noted above, is of a highly uniform particle size, having essentially insignificant quantities of any fines or oversize particles. To illustrate, when ammonium nitrate prills of a preferred type having at least about ninety percent of the prills falling in the range of about six to about fourteen mesh size are coated, it has been found ordinarily that in excess of eighty percent of the final product falls within the range of about six to about twenty-four mesh size (U.S. Standard).

To determine highly significant caking test data, the following test has been employed which it is believed accurately and reproducibly simulates practical storage conditions of stacking pressure, temperature, humidity, and the like.

Three bags of a lot (usually hundred pound bags) are placed in a stack and are weighted to equal a stack of ten bags. An insulated room is provided for accelerated storage tests. The material under test is usually run simultaneously with products of known storage characteristics or others being tested for comparison under identical conditions. The storage test is accelerated by alternately heating (to 100° F. or above) and cooling (to 60° F. or below) the bagged material. A constant measurement of the temperature in the room and within the bags is made by inserted thermocouples connected to a recording potentiometer. Heat is supplied by an electric circulator with fan speed and temperature controlled automatically by an electronic regulator. The heated bag temperatures are maintained for at least ten hours. Cooling temperatures are maintained by an air conditioner controlled by thermostat. A time period of five days is necessary for each temperature cycle. The temperature is taken through the cycles twelve times before removal of the samples for analysis. The total testing period is ninety days.

The test bags then are dropped four feet in a controlled manner using a special dropping mechanism alternatively on the flat sides of the bag for a total of four times.

The bag is then opened, very large lumps are removed, and the residue is screened with a No. 4 sieve. The removed lumps and that portion which fails to pass the No. 4 screen are combined and weighed. This total weight determines the percent drillability.

When the coated prill products of this invention are exposed to the above caking test with or without presence of an anti-caking agent, essentially complete free-flowabilities are shown.

The following examples are presented in further illustration of the composition and process of this invention but not in limitation thereof.

*Example 2*

A 40–10–0 analysis product employing urea prills instead of ammonium nitrate prills is made following substantially the same procedure described in Example 1. The urea prills used in the process have a density of about forty-five pounds per cubic foot and a moisture content of about 0.25 percent by weight. A seventy-five percent "furnace" phosphoric acid is employed and liquid ammonia is employed as in Example 1 as the ammoniating agent.

The formula employed in the formulation on a ton basis is as follows: urea, 1,543 pounds; seventy-five percent phosphoric acid, 371 pounds; anhydrous ammonia, 73 pounds. As in Example 1 about a 1:1 recycle rate was employed. In drying the finally encased prills, the temperature of the air within the dryer is maintained at about 300° F.

The analysis of the final product consisting of urea prills within an encasement as above provided showed the following: nitrogen, 39.35 percent; $P_2O_5$, 11.65 percent; moisture, 0.36 percent and the pH of a ten percent by weight aqueous solution of the prills was 6.6.

Screening showed the particle size distribution:

| Mesh Size (Screen No.) | Percent by Weight | |
|---|---|---|
| | Product | Starting Urea Prills |
| On 6 | 1.6 | 0 |
| On 8 | 5.2 | 1.6 |
| On 10 | 11.3 | 9.1 |
| On 12 | 17.0 | 15.1 |
| On 14 | 21.4 | 29.0 |
| On 16 | 19.9 | 28.3 |
| On 20 | 17.1 | 14.3 |
| On 35 | 5.0 | 2.5 |
| Through 35 | 1.7 | 0.1 |

*Example 3*

Potassium chloride granules of irregular shape were screened to remove all particles which would pass through a No. 14 screen (U.S. standard) and all particles too large to pass a No. 8 Screen. This granular material of narrow particle size distribution was fed to the phosphoric acid treatment zone of an apparatus of the type discussed and illustrated diagrammatically in FIGURE 1. Furnace process acid of 75% concentration was employed in step (a) in the ratio of 556 pounds of acid per 1339 pounds of potassium chloride charged. In the ammoniator 121 pounds of ammonia was reacted with each 1339 pounds of potassium chloride charged. Approximately two parts of product of steps (c) and (d) were recycled along with each part of potassium chloride charged. In spit of the fact that the potassium chloride particles charged to step (a) were of very irregular shape, the particles obtained in step (c) were substantially spherical in shape. The dry product of step (d) remained stable and free-flowing in storage and possessed fertilized values corresponding to the designation 5–15–40, representing equivalent percentages of N, $P_2O_5$ and $K_2O$.

*Example 4*

Ammonium nitrate prills, red potassium chloride granules and particles of a mixed fertilizer having an $N/P_2O_5/K_2O$ analysis of 16–48–0 were first screened so that they possessed substantially identical particle size distribution and were than charged to step (a) in the ratio of 645 pounds of ammonium nitrate, 565 pounds of potassium chloride and 298 pounds of 16–48–0. Wet process phosphoric acid of 75 percent concentration was used in step (a) in the corresponding amount of 361 pounds, which was then neutralized in the ammoniator section with 80 pounds of ammonia. The product of step (c) consisted of substantially spherical particles of uniform appearance with the exception of the color of the coated impure red potassium chloride particles. Approximately one part of product from steps (c) and (d) was recycled along with one part of uncoated feed mixture. The dry product of step (d) analyzed as follows: 17.48% N, 18.6% $P_2O_5$ and 16.3% $K_2O$. This product was treated with one percent diatomaceous earth to improve free-flowing properties on prolonged storage in bulk. To make this product more visually attractive and readily distinguishable from other products of different composition, a green pigment was mixed with a diatomaceous earth before treatment.

*Example 5*

Red fertilizer grade potassium chloride was screened to give a particle size distribution essentially identical to that of prilled ammonium nitrate. The potassium chloride granules and ammonium nitrate prills were then fed into the reactor in the proportions of 1200 pounds of ammonium nitrate and 334 pounds of potassium chloride, being treated with 370 pounds of wet process phosphoric acid of 75% concentration, which was then neutralized with 73 pounds of ammonia. In starting up the equipment, uncoated feed was passed through the acidizer, mixer and ammoniator, bypassing the dryer and recycling the entire stream before the acid spray was turned on. The flow of ammonia was delayed until acid-wet particles began to follow into the ammoniator. No material was fed to the dryer until wet product began to leave the ammoniator and flow conditions in the acidizer indicated that addition of dry particles would be beneficial. Product from the dryer was recycled until the desired analysis was reached and the rate of flow of uncoated granules, phosphoric acid and ammonia had been adjusted to the proportions as given above. Under continuous operating conditions the feed consisted of about one part of uncoated particles and one part of recycled coated particles. The major portion of the recycle stream consisted of wet product from step (c), the relative amount of dry recycle from step (d) being adjusted to obtain free-flowing conditions in step (a). Analysis of a sample of dry product of step (d) showed the following equivalent fertilizer values: 24.38% N, 13.07% $P_2O_5$, 10.13% $K_2O$. The product consisted of coated particles of substantially spherical shape which remained stable and free-flowing in bulk storage.

In view of the above description and illustrative examples, the manner of praticing the invention will be clearly apparent to a person who is skilled in the art, including many specific modifications and variations which lie within the scope of the claimed invention.

What is claimed is:
1. A process for manufacturing nitrogen and phosphorus containing mixed fertilizer comprising the steps carried out in the following sequence:
   (a) Wetting with phosphoric acid containing from about 10 to 30 percent water a moving bed of discrete solid particles of controlled size within the range of about 6 to 24 mesh (U.S. Standard) of at least one water-soluble fertilizer composition with the provision that one-fourth to three-fourths of the particles in the moving bed are recycled from steps (c) and (d) and that particles of differing chemical composition possess substantially identical particle size distribution;
   (b) Mixing the discrete solid particles after wetting with acid in step (a) to yield a free-flowing bed of acid-wet particles;
   (c) Reacting ammonia with the free-flowing bed of acid wet particles of step (b) at a temperature below about 200° F. (93° C.) while subjecting said particles to a rolling motion to yield a free-flowing bed of particles of substantially spherical shape;
   (d) Drying the particles of substantially spherical shape produced in step (c) to yield a uniform, free-flowing, storage stable fertilizer composition consisting predominantly of particles possessing a core of water-soluble fertilizer composition and an intimately bonded shell of an ammonium salt of phosphoric acid; and
   (e) Recycling to step (a) a portion of the particles produced by steps (c) and (d).

2. A process for manufacturing nitrogen and phosphorus containing mixed fertilizer comprising the steps carried out in the following sequence:
   (a) Wetting with phosphoric acid containing from about 15 to 20 percent water a moving bed of discrete solid particles of controlled size within the range of about 6 to 24 mesh (U.S. Standard) of at least one water-soluble fertilizer composition, with the provision that one-fourth to three-fourths of the particles in the moving bed are recycled from steps (c) and (d) and that particles of differing chemical composition possess substantially identical particle size distribution;
   (b) Mixing the discrete solid particles after wetting with acid in step (a) to yield a free-flowing bed of acid-wet particles;
   (c) Reacting ammonia with the free-flowing bed of acid-wet particles of step (b) while subjecting said particles to a rolling motion and maintaining the temperature within the range of about 160° to 180° F. (71° to 82° C.) to yield a free-flowing bed of particles of substantially spherical shape;
   (d) Drying the particles of substantially spherical shape produced in step (c), maintaining the temperature below about 220° F. (104° C.) when the particles are wet and below about 300° F. (149° C.) when the particles are dry, to yield a uniform, free-flowing, storage stable fertilizer composition consisting predominantly of particles possessing a core of water-soluble fertilizer composition and an intimately bonded shell of an ammonium salt of phosphoric acid; and
   (e) Recycling to step (a) a portion of the particles produced by steps (c) and (d) equal to from about one-fourth to three-fourths of the total particulate solids fed into step (a).

References Cited by the Examiner

UNITED STATES PATENTS

| | | | |
|---|---|---|---|
| Re. 19,750 | 11/1935 | Billings et al. | 23—313 |
| 1,239,211 | 9/1917 | Rodman | 23—313 |
| 2,041,088 | 5/1936 | Pfirman | 71—64 |
| 2,600,253 | 6/1952 | Lutz | 71—64 |
| 2,963,359 | 12/1960 | Moore | 71—64 |
| 3,092,489 | 6/1963 | Smith | 71—64 |
| 3,125,435 | 3/1964 | Alfrey et al. | 71—64 |
| 3,135,596 | 6/1964 | Sesso | 71—64 |

DONALL H. SYLVESTER, *Primary Examiner.*
ANTHONY SCIAMANNA, T. D. KILEY,
*Assistant Examiners.*